United States Patent [19]
Fuwa et al.

[11] Patent Number: 5,439,406
[45] Date of Patent: Aug. 8, 1995

[54] METHOD FOR PEELING THE SAFETY PANEL OF A CRT

[75] Inventors: Yoshio Fuwa; Kuninori Hirata, both of Aichi, Japan

[73] Assignee: Sony Corporation, Tokyo, Japan

[21] Appl. No.: 133,318

[22] Filed: Oct. 8, 1993

[30] Foreign Application Priority Data

Oct. 9, 1992 [JP] Japan .................................. 4-271811

[51] Int. Cl.⁶ .............................................. H01J 9/50
[52] U.S. Cl. ............................................ 445/2; 445/61; 156/344
[58] Field of Search ...................... 445/2, 61; 156/344

[56] References Cited

U.S. PATENT DOCUMENTS 2,999,781  9/1961  Davis ........................................ 445/2
4,334,945  6/1982  Raush ...................................... 156/344

FOREIGN PATENT DOCUMENTS 612778  6/1978  U.S.S.R. ................................. 156/344

OTHER PUBLICATIONS

R. W. Nufer, "Pressure Separation of Cast Green Ceramic," *IBM Tech. Discl. Bull.*, vol. 16, No. 9 (Feb. 1974) p. 2892.

Primary Examiner—P. Austin Bradley
Assistant Examiner—Jeffrey T. Knapp
Attorney, Agent, or Firm—Hill, Steadman & Simpson

[57] ABSTRACT

A safety panel that is bonded to a front surface of a panel of a cathode ray tube envelope can be peeled easily without damaging the safety panel. A cathode ray tube (5) has a safety panel (3) that is bonded to a front surface of a panel (2) through a resin layer (4). When the safety panel (3) is to be peeled, the surface of the safety panel (3) is rapidly heated by a sheet-shaped infrared heater (6) and the resin layer (4) is heated up to a melting point and softened by the heat conduction. Then, a spatula (7) is inserted into a spacing between the safety pane (3) and the resin layer (4) to thereby peel the safety panel (3).

8 Claims, 8 Drawing Sheets

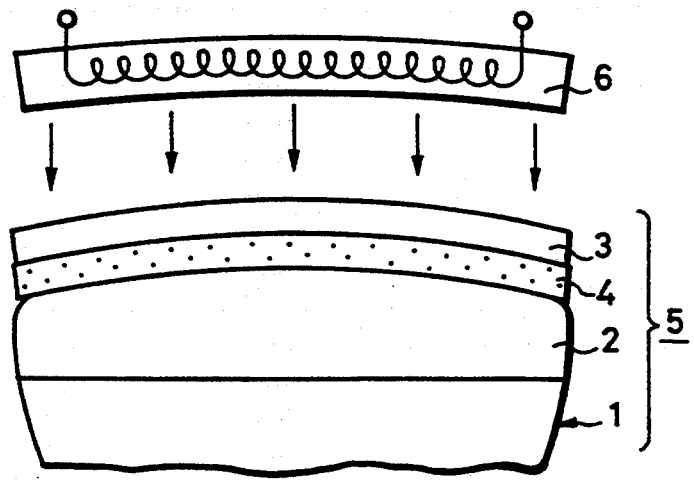
F I G. 2A
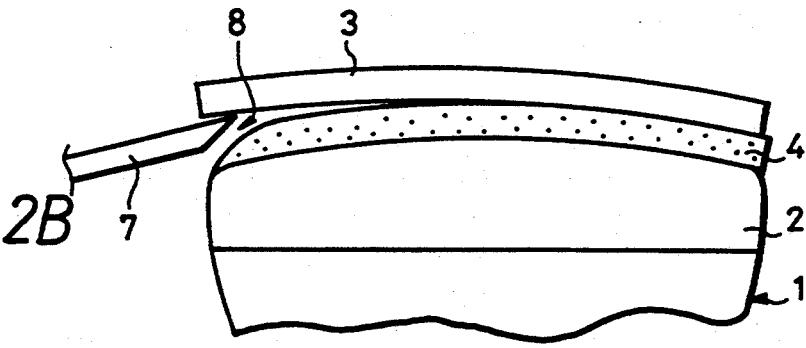
F I G. 2B
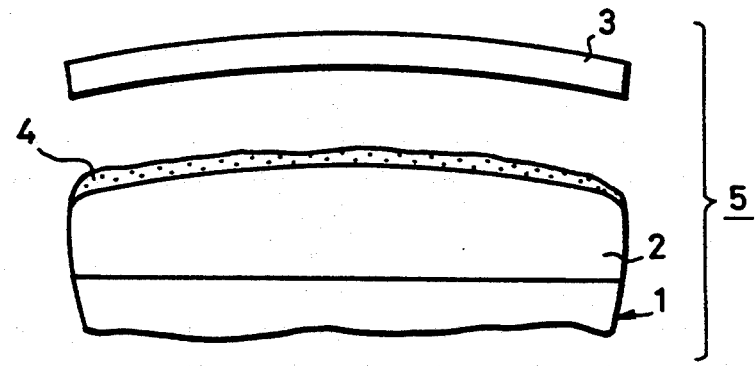
F I G. 2C

METHOD FOR PEELING THE SAFETY PANEL OF A CRT

BACKGROUND OF THE INVENTION

1. Field of the Invention

The present invention relates to a cathode ray tube in which a safety panel is bonded to a front surface of a panel with a resin layer and, more particularly to a method of and apparatus for peeling a safety panel so that the safety panel and a cathode tube envelope can be recycled.

2. Description of the Related Art

In conventional cathode ray tubes, there is a known design for a cathode ray tube 5 in which a safety panel 3 for anti-explosion protection is bonded to a front surface of a panel 2 of a cathode ray tube envelope 1 through a thermosetting resin layer (e.g., unsaturated polyester resin) 4. However, when it is determined that such cathode ray tube 5 is a defective product after the manufacturing process, then the safety panel 3 is peeled from the cathode ray tube envelope 1 so that the safety panel 3 and the cathode ray tube envelope 1 may each be recycled respectively.

One method of peeling the safety panel 3 that is bonded to the front surface of the panel 2 by the thermosetting resin layer 4, has heretofore been proposed in which a metal wire or piano wire is forced into a portion of the thermosetting resin layer 4 between the panel 2 and the safety panel 3 to cut the thermosetting resin layer 4 and to thereby peel the safety panel 3 from the panel 2.

This conventional method of peeling the safety panel 3 from the panel 2 has the following disadvantages:

(i) Since metal wire or piano wire is used, the safety panel 2 and the surface of the panel 2 of the cathode ray tube tend to be scratched and therefore cannot be recycled as easily. If they are scratched badly, then the cathode ray tube envelope will explode, which is very dangerous for workers.

(ii) Inserting the metal wire or piano wire into the thermosetting resin layer 4 requires a worker with physical strength and skill, which unavoidably limits the workers.

(iii) A portion of the resin remains in the inner surface of the safety panel 3 and the surface of the panel 2 of the cathode ray tube envelope 1 so that the safety panel 3 and the cathode ray tube envelop 1 are difficult to recycle. Furthermore, if the safety panel 3 and the cathode ray tube envelope 1 are discarded in the above-mentioned state, then this will lead to environmental problems.

Alternatively, there has heretofore been proposed a method in which only the cathode ray tube envelope 1 is recycled at the sacrifice of the safety panel 3. In this case, however, the safety panel 3 is very expensive and it is desired to recycle both the safety panel 3 and the cathode ray tube envelope 1.

OBJECTS AND SUMMARY OF THE INVENTION

Therefore, it is an object of the present invention to provide an improved peeling method for the safety panel of a cathode ray tube in which the aforesaid shortcomings and disadvantages encountered with the prior art can be eliminated.

More specifically, it is an object of the present invention to provide a method of and apparatus for peeling a safety panel of a cathode ray tube in which a safety panel and a cathode ray tube envelope can be recycled.

According to an aspect of the present invention, a method is provided for peeling a safety panel bonded to a front surface of a panel of a cathode ray tube through a resin layer which comprises the steps of heating the resin layer through the safety panel to soften the resin layer, and applying an external force to the softened resin layer and the safety panel to thereby peel the safety panel from the resin layer.

According to another aspect of the present invention, there is provided an apparatus for peeling a safety panel of a cathode ray tube which comprises a heating area in which a cathode ray tube in which a safety panel is bonded to a front surface of a panel through a resin layer is supplied, a sheet-shaped heater provided in the heating area in parallel to the outer surface of the safety panel, an area of the sheet-shaped heater being larger than that of the safety panel, and a heat cutting-off device provided on the side surface of the safety panel.

In the method of peeling the safety panel, the resin layer is rapidly heated and softened so that the adhesion between the safety panel and the resin layer is weakened. As a result, a stress accumulated when the resin layer is cured is released. In this state, by forming the space between the safety panel and the resin layer by the work from the outside, the safety panel can be peeled with ease without damaging the safety panel and the surface of the panel of the cathode ray tube envelope.

Further, according to the present invention, the cathode ray tube is taken out from the area in which the heating device is set in the heating-up state and the safety panel is peeled after the cathode ray tube was supplied to the above-mentioned area and the resin layer was heated rapidly, whereby the peeling work can be carried out efficiently in a short period of time.

According to the apparatus for peeling the safety panel of the present invention, this peeling apparatus includes a heating area in which the cathode ray tube is supplied and the sheet-shaped heater having an area larger than that of the safety panel disposed in this heating area parallel to the outer surface of the safety panel. Therefore, the whole area of the safety panel is uniformly heated and the resin layer provided beneath the safety panel is heated uniformly so that the safety panel can be peeled satisfactorily.

Furthermore, a heat cut-off device is provided at the side surface of the panel of the cathode ray tube, whereby the panel can be prevented from being heated by the sheet-shaped heater and the resin layer can be efficiently heated through the safety panel. Therefore, the safety panel can be peeled with ease while the cathode ray tube envelope is prevented from being damaged by the heating.

The above and other objects, features, and advantages of the present invention will become apparent from the following detailed description of an illustrative embodiment thereof to be read in conjunction with the accompanying drawings, in which like reference numerals are used to identify the same or similar parts in the several views.

BRIEF DESCRIPTION OF THE DRAWINGS

FIGS. 2A to 2C are process diagrams showing a method of peeling a safety panel of a cathode ray tube according to the present invention, respectively;

DETAILED DESCRIPTION OF THE PREFERRED EMBODIMENT

Figure 1:
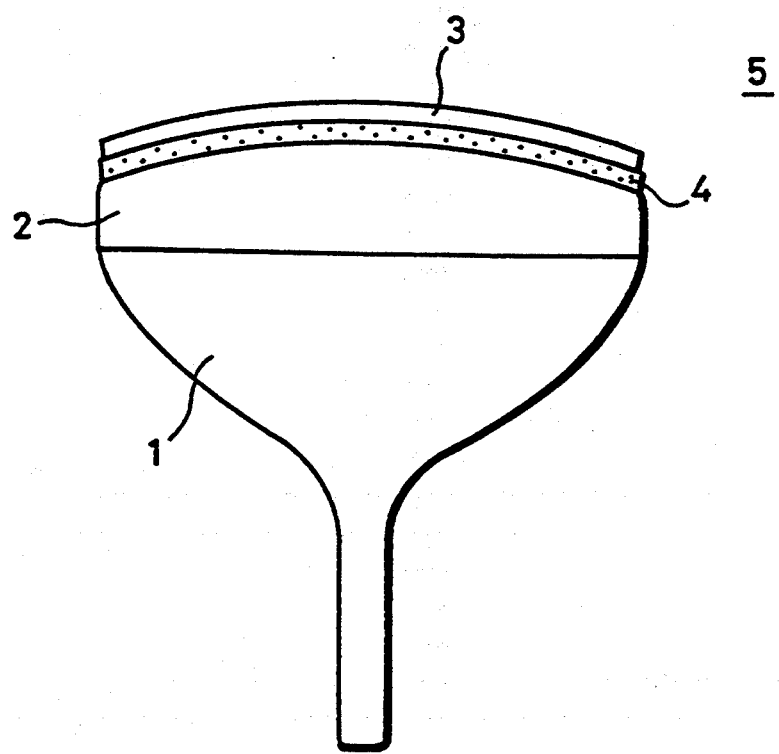
FIG. 1 is a diagram showing an arrangement of a cathode ray tube having a safety panel.

An embodiment of the present invention will hereinafter be described with reference to the drawings.

FIGS. 2A to 2C are respectively process diagrams showing a method of peeling a safety panel according to an embodiment of the present invention. Throughout FIGS. 2A to 2C, reference numeral 5 designates a cathode ray tube in which the safety panel 3 for anti-explosion and blind is bonded to the front surface of the panel 2 of the cathode ray tube envelope 1 with the thermosetting resin layer (e.g., unsaturated polyester resin) 4.

Initially, as shown in FIG. 2A, the thermosetting resin layer 4 that bonds the panel 2 and the safety panel 3 together is heated rapidly. In this embodiment, the surface of the safety panel 3 is rapidly heated by an infrared heater, for example, a ceramic heater 6 opposing the safety panel 3. The thermosetting resin layer 4 is thus rapidly increased in temperature up to near a boiling point by heat conduction.

The rapid heating of the thermosetting resin layer 4, and particularly the resin layer formed at the boundary of the safety panel 3 is heated at high temperature and a coupling force, i.e., adhesion of the safety panel 3 and the thermosetting resin layer 4 is weakened, thereby releasing stress accumulated when the thermosetting resin layer 4 is cured.

As shown in FIG. 2B, under this condition, a wedge-shaped spatula 7 is inserted into a spacing between the safety panel 3 and the resin layer 4 to form a space 8 between the safety panel 3 and the resin layer 4. Then, the wedge-shaped spatula 7 is further advanced to peel the safety panel 3 from the resin layer 4 as shown in FIG. 2C.

The space 8 is formed between the safety panel 3 and the resin layer 4 by the insertion of the wedge-shaped spatula 7 and the spatula 7 is further advanced, whereby the safety panel 3 can be peeled from the resin layer 4 very easily in cooperation with the flow of air into the space 8. That is to say, the safety panel 3 can be peeled from the resin layer 4 without damaging the safety panel 3 and the surface of the panel 2.

A safety panel peeling apparatus according to the embodiment of the present invention will now be described completely.

Figure 3B:
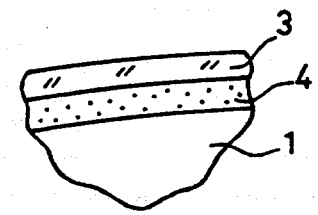
FIG. 3A is a front view of an apparatus for peeling a safety panel of a cathode ray tube according to the present invention; 3B is an enlarged cross-sectional illustration of the CRT screen for the CRT illustrated in FIG. 3A.
Figure 3A:
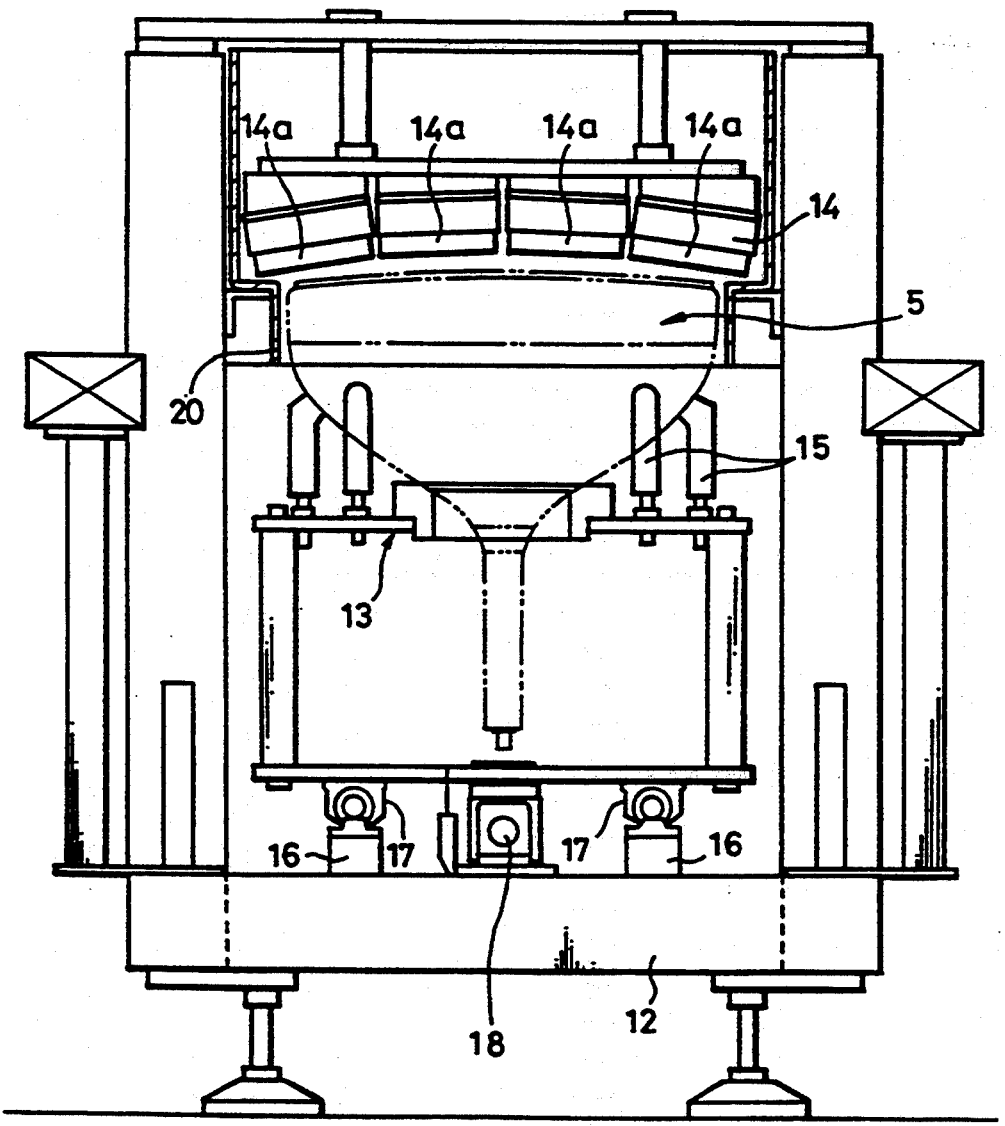
Figure 4:
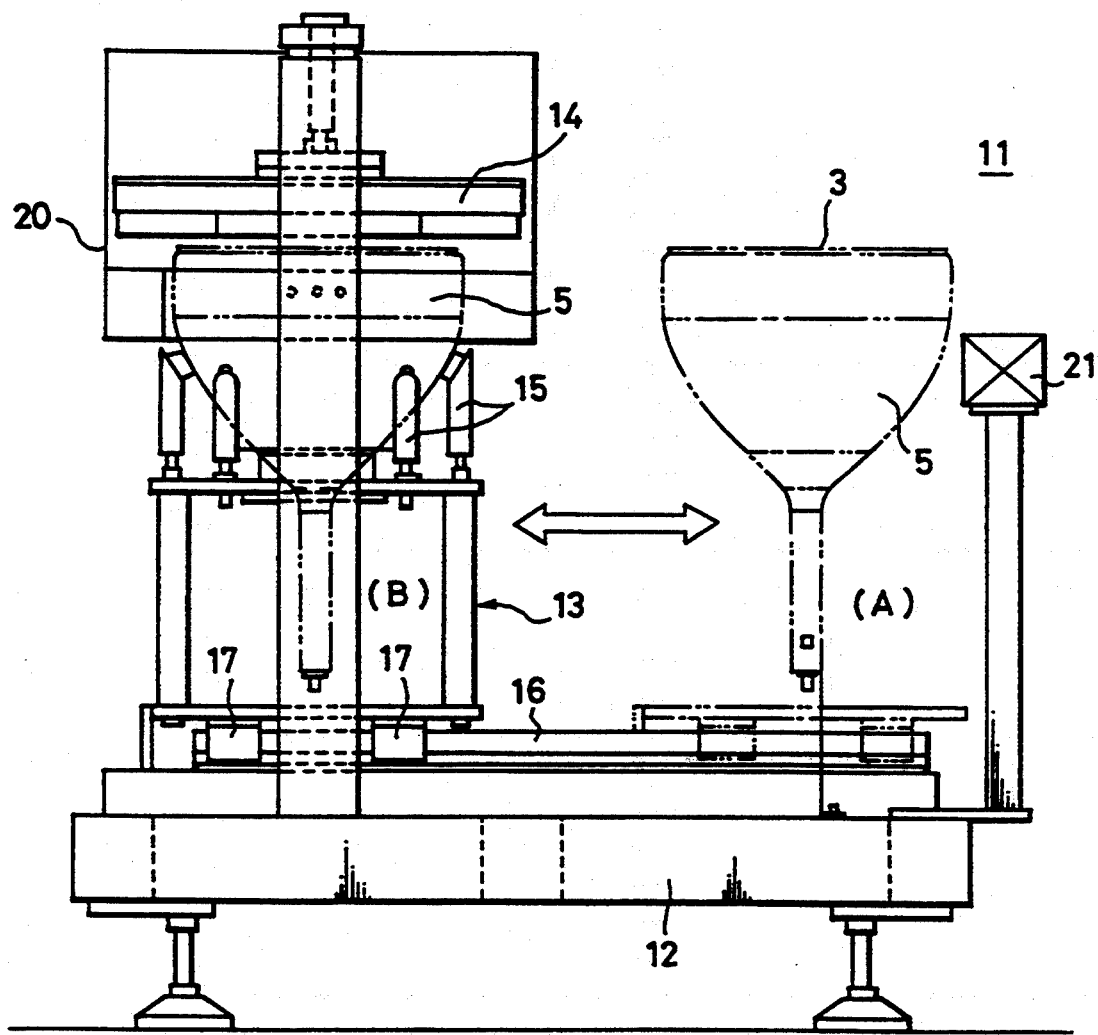
FIG. 4 is a side view of the apparatus illustrated in FIG. 3.

FIGS. 3A and 4 are a front view and a side view showing the overall arrangement of a peeling apparatus 11. As illustrated, the peeling apparatus 11 comprises a table 12, a positioning unit 13 for the cathode ray tube 5 provided so as to become movable between working positions and a heating means 14.

The positioning unit 13 includes supporting members 15 for vertically positioning and supporting the cathode ray tube 5 such that the safety panel 3 is faced upwardly. The positioning unit 13 includes at its lower portion guide portions 17 which are in engagement with rails 16 provided on the table 12. The positioning unit 13 can be moved along the rails 16 by a rodless cylinder (air pressure cylinder) 18 serving as a driving source between a supply and take-out position A of the cathode ray tube 5 and a heating position (i.e., heating area) B in which the heating means 14 is provided.

At the heating position B, in order to rapidly heat the surface of the safety panel 3 of the cathode ray tube 5, there is provided a sheet-shaped infrared heater, in this embodiment, a ceramic heater is the heating means 14. The heating means, i.e., the sheet-shaped ceramic heater 14 comprises 16 ceramic heater elements 14a each of which outputs power of 200 V×800 W. The ceramic heater 14 covers the whole surface of the safety panel 3. Also, the area of the sheet-shaped ceramic heater 14 is set to be larger than that of the safety panel 3 so that the whole surface of the safety panel 3 can be heated simultaneously and efficiently.

Further, the sheet-shaped ceramic heater 14 is disposed in a curved fashion in accordance with the curvature of the surface of the safety panel 3 such that the sheet-shaped ceramic heater 14 becomes parallel along the surface of the safety panel 3, i.e., a distance between the heater 14 and each portion of the surface of the safety panel 3 becomes constant.

In the sheet-shaped ceramic heater 14, each ceramic heater element 14a includes a temperature controller and all of the 16 ceramic heater elements 14a can be controlled in temperature individually.

Furthermore, the sheet-shaped ceramic heater 14 and the cathode ray tube envelope 1, particularly, the panel 2 include thereon a heat cut-off cover member 20 so that only the surface of the safety panel 3 can be rapidly heated aggressively.

This cover member 20 is disposed near the side surface (i.e., outer periphery except the sides in which the cathode ray tube 5 is entered and withdrawn) of the panel 2 side of the cathode ray tube envelope 1 such that electromagnetic waves (infrared rays) radiated from the sheet-shaped ceramic heater 14 are prevented from reaching a place that is not desired to be heated, such as the side surface of the cathode ray tube 1 or the like.

The cover member 20 can be formed of an SUS material which absorbs heat, for example, or can be formed by members that are treated by a plating treatment for reflecting infrared rays such as a mirror treatment or the like.

Operation of the above-mentioned peeling apparatus 11 will be described below.

At the heating position B, the sheet-shaped ceramic heater 14 is in its fully heating-up condition of 600° C. to 700° C.

Initially, at the cathode ray tube supply/take-out position A, the cathode ray tube 5 whose safety panel 3 is to be peeled is inserted into the cathode ray tube positioning unit 13 by a worker.

When the worker presses an activation switch of an operation box 21, then the rodless cylinder 18 is energized and the positioning unit 13 that holds thereon the cathode ray tube 5 is moved to the heating position B.

Then, the sheet-shaped ceramic heater 14 whose temperature is raised up to 600° C. to 700° C. rapidly heats, the surface of the safety panel 3 of the cathode ray tube 5 in excess of 250° C. and then the thermosetting resin layer 4 is rapidly heated near its melting temperature by heat conduction from the safety panel 3.

A clearance between the sheet-shaped ceramic heater 14 and the safety panel 3 is about 15±5 mm. A heating time of about 120 seconds is required.

At the heating position B, after a constant time (about 120 seconds in this embodiment) passes since the heating has been started, the cathode ray tube positioning unit 13 is automatically moved by a timer in which a time is set in advance or the like to thereby move the cathode ray tube 5 again to the cathode ray tube supply/take-out position A.

At that time, the surface of the safety panel 3 is heated to more than 250° C. and the thermosetting resin layer 4 provided under the safety panel 3 is softened so that adhesion between the safety panel 3 and the thermosetting resin layer 4 is weakened.

At this timing point, it is frequently observed that the safety panel is peeled from the resin layer naturally.

The worker then inserts the wedge-shaped spatula 7 into the spacing between the safety panel 3 and the resin layer 4, the space 8 is formed between the inner surface of the safety panel 3 and the resin layer 4. In cooperation with the flow of air into this space 8, the safety panel 3 is peeled from the cathode ray tube envelope 1 with ease by advancing the spatula 7 with slight pressure.

After the safety panel 3 is peeled from the cathode ray tube envelope 1, the remaining resin layer 4 in the softened state can be easily removed with the spatula 7 or the like.

Further, the resin layer 4 left on the inner surface of the safety panel 3 can be removed by an ultrasonic rinsing process. Also, the resin layer remaining on the panel surface of the cathode ray tube envelope 1 can be removed by steel wool or the like.

According to the above-mentioned peeling method for the safety panel 3, since the surface of the safety panel 3 is heated rapidly and the thermosetting resin layer 4 provided just beneath the safety panel 3 is softened by the heat conduction to thereby weaken the adhesion, the safety panel 3 can be easily peeled from the cathode ray tube envelope 1 without damaging the safety panel 3 and the cathode ray tube envelope 1 and also without exerting bad influence on spectral reflectivity which is the characteristic of the safety panel 3.

Since the resin layer 4 remaining on the inner surface of the safety panel 3 and on the panel surface of the cathode ray tube 1 after the safety panel 3 was peeled from the cathode ray tube envelope 1 is in the softened state, such resin layer 4 can be removed with ease. Therefore, both the safety panel and the cathode ray tube envelope 1 can be recycled as excellent assembly parts.

Further, when the safety panel 3 is peeled from the cathode ray tube envelope 1 in this manner, the safety panel 3 and the cathode ray tube envelope 1 can be prevented from being damaged. Therefore, there is then no risk that the cathode ray tube envelope 1 is exploded, and the safety of workers is ensured. In the peeling work, physical strength is not needed and skill is not required so that a worker having special skills is not required. Therefore, anyone can carry out the peeling work.

On the other hand, in the peeling apparatus 11, at the heating position B, the sheet-shaped ceramic heater 14 is raised in temperature up to 600° C. to 700° C. in advance into which the cathode ray tube 5 is supplied and heated. Therefore, the surface of the safety panel 3 can be rapidly heated in a short period of time and throughput can be increased.

Further, since the sheet-shaped ceramic heater 14 that is larger in area than the safety panel 3 is used as the heating means, the whole surface of the safety panel 14 can be heated uniformly. Simultaneously, since the side surface of the cathode ray tube envelope 1 is covered with the cover member 20, only the surface of the safety panel 3 can be efficiently heated without heating the cathode ray tube envelope 1.

Furthermore, since the cathode ray tube envelope 1 is not heated, there is then no risk that the cathode ray tube envelope 1 is destroyed.

On the other hand, because the sheet-shaped ceramic heater 14 is an infrared heater it has several advantages.

The heating done by the infrared rays has less energy loss through the medium, therefore the safety panel 3 can be heated efficiently.

The ceramic heater is a sheet-shaped heater, thus the infrared rays can be radiated in one direction highly efficiently.

Additionally, the safety panel 3 can be heated without smudging the surface thereof. A so-called clean heating thus becomes possible.

Figure 5:
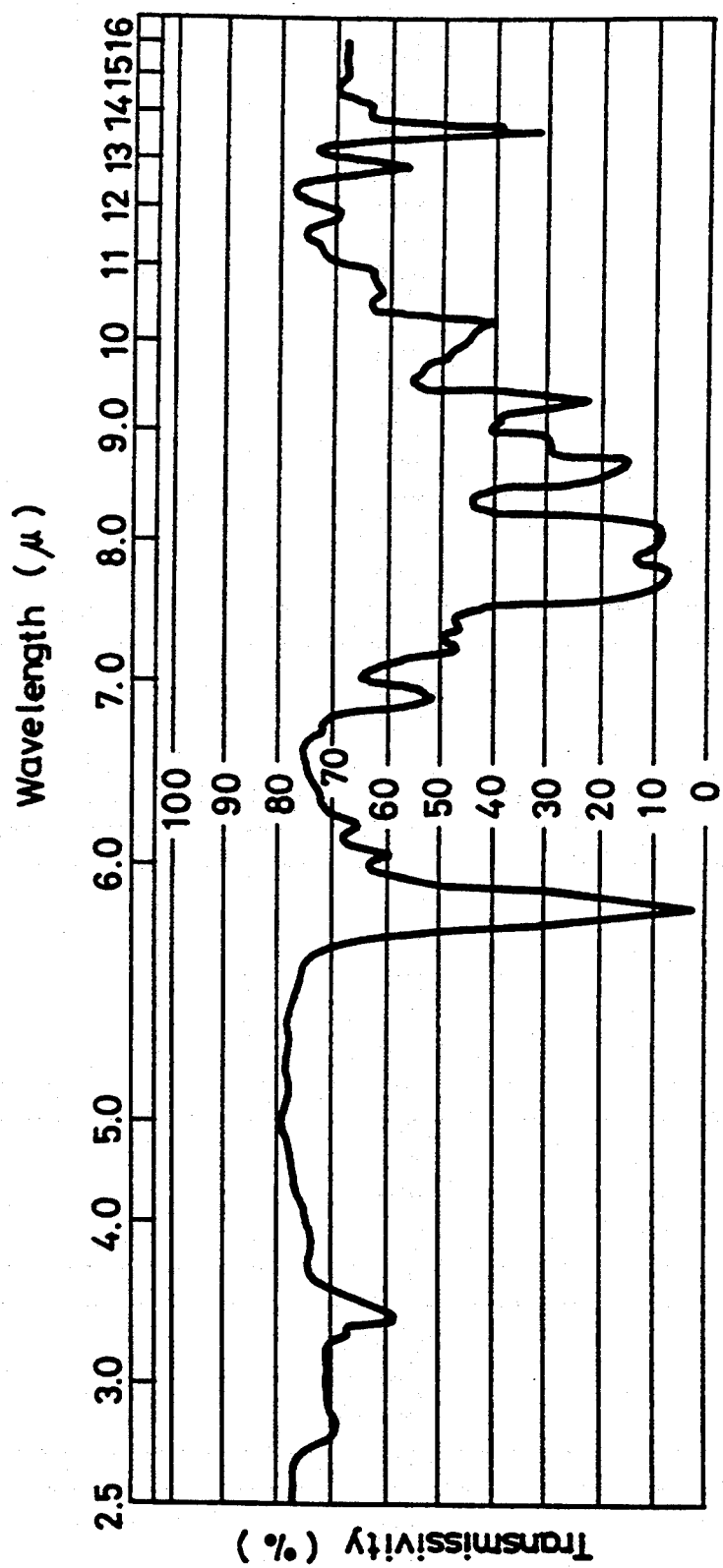
FIG. 5 is a diagram of infrared ray absorption spectrum of a thermosetting resin (polyester-based resin)
Figure 6:
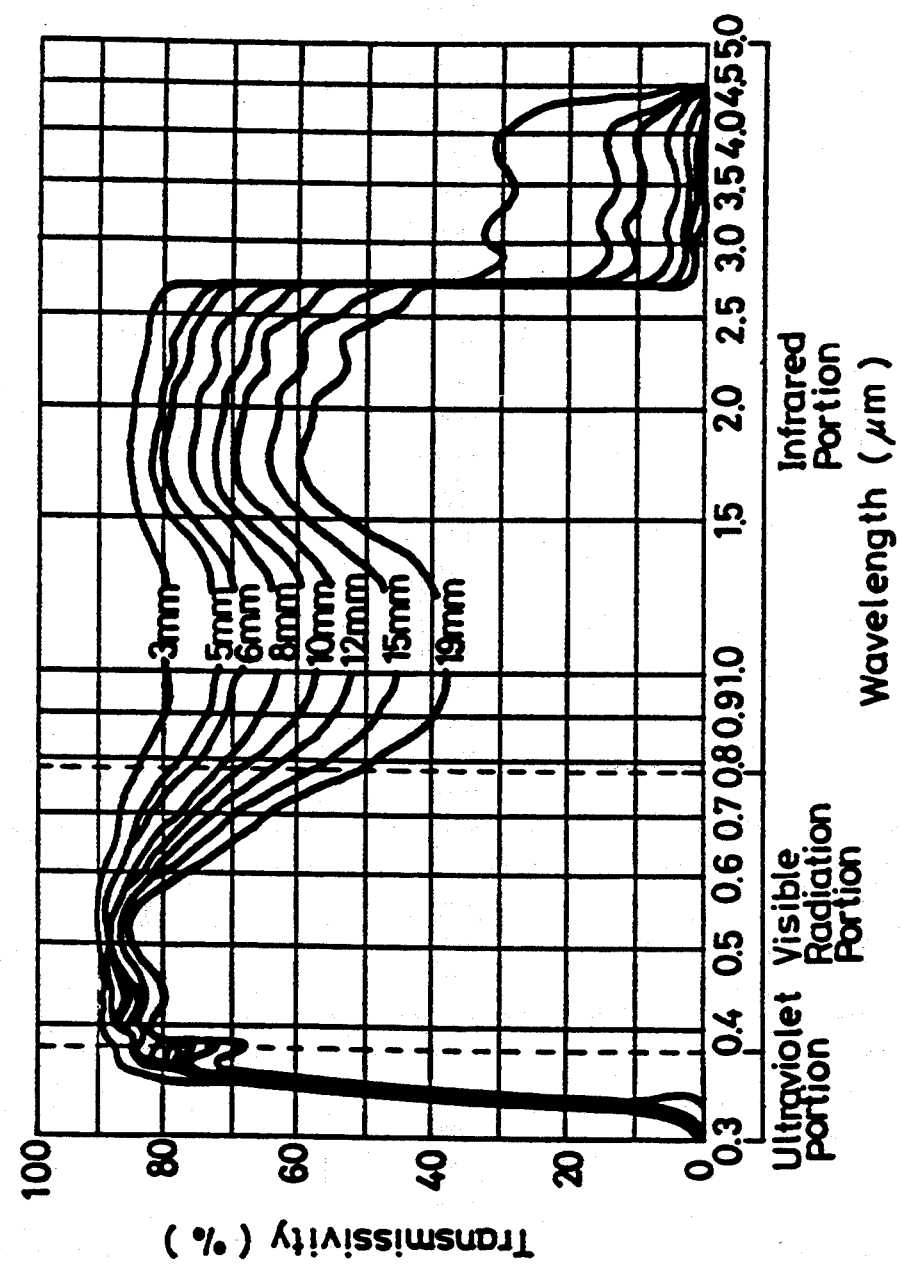
FIG. 6 is a diagram of infrared ray absorption spectrum of a clear glass (safety panel)
Figure 7:
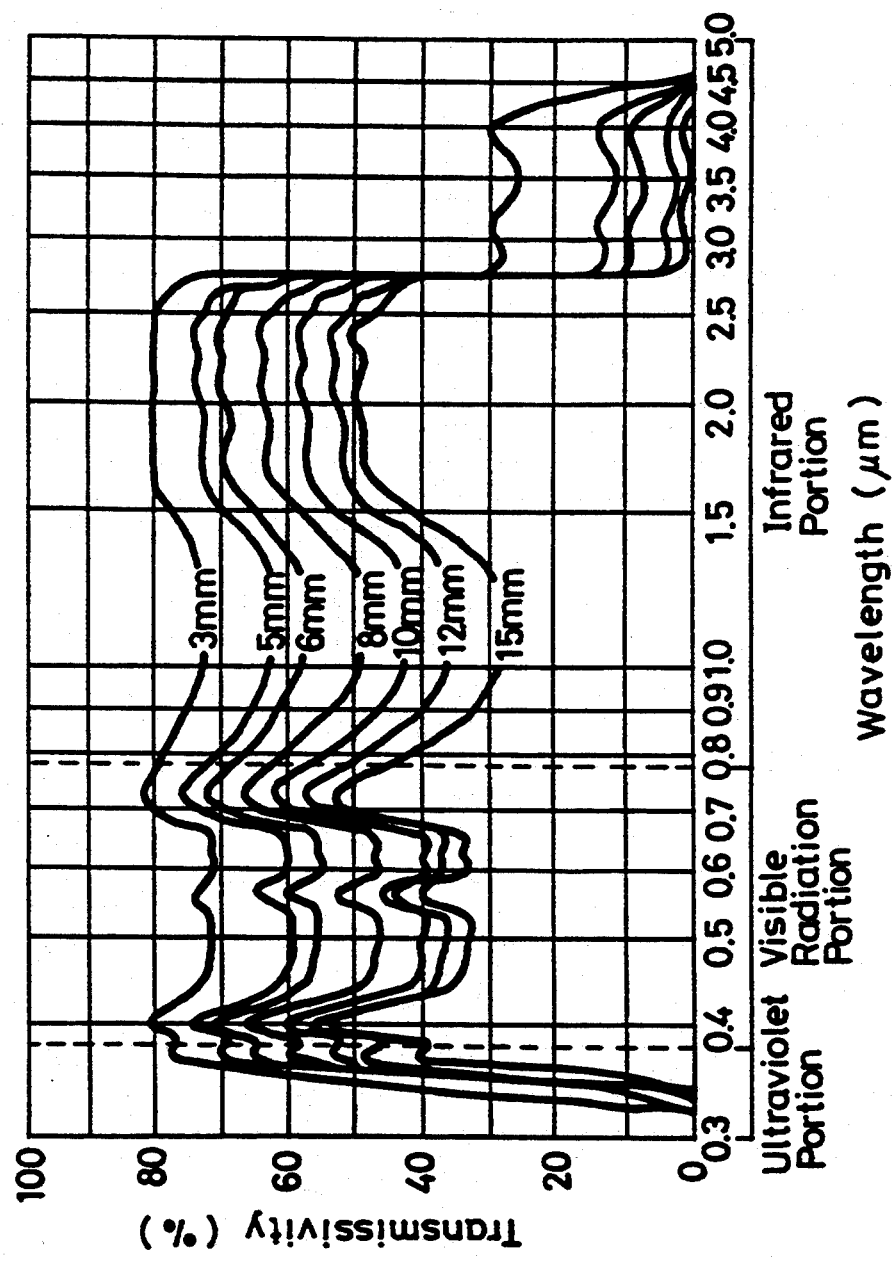
FIG. 7 is a diagram of infrared ray absorption spectrum of a gray glass (safety panel)

The safety panel 3 may be either a clear glass or a gray glass. The clear glass and the gray glass, as shown by a clear glass infrared absorption spectrum of FIG. 6 and by a gray glass infrared absorption spectrum of FIG. 7, each have an infrared absorption area that is out of the far-infrared area so the safety panel 3 can be efficiently heated by the ceramic heater 14. Incidentally, as shown by a thermosetting resin (polyester-based resin) infrared absorption spectrum of FIG. 5, the infrared absorption area of the thermosetting resin also is out of the far-infrared area.

Figure 8:
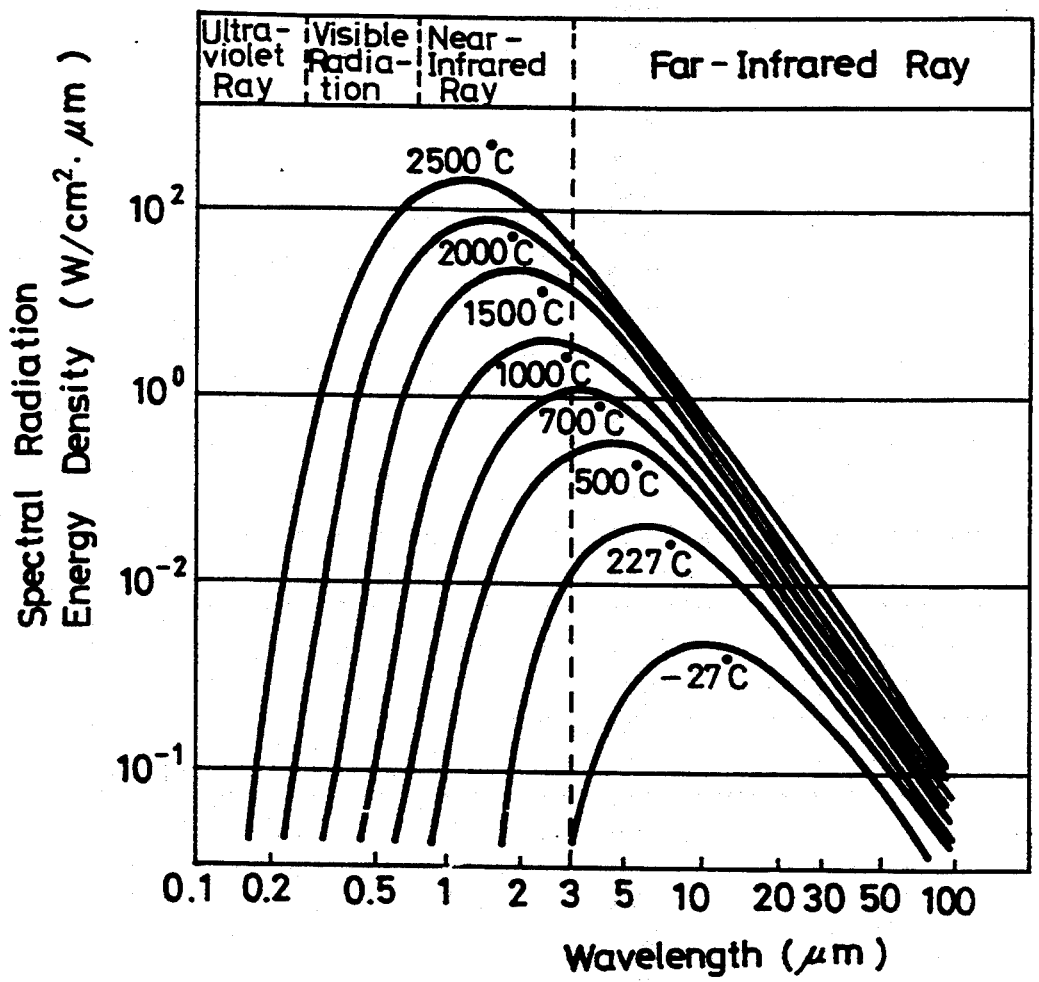
FIG. 8 is a diagram of spectrum radiation energy of black bodies plotted at respective temperatures.

Further, if the temperature of the ceramic heater 14 is increased to the extent that it radiates a wavelength of a near-infrared wavelength region, i.e., increased to about 600° C. to 700° C. regardless of the far-infrared wavelength, then the amount of the whole radiation energy can be increased as shown in FIG. 8, thereby effecting the rapid heating.

The infrared radiation efficiency can be maintained high by using the ceramic heater 14.

Further, since temperature distributions of the individual ceramic heater elements 14a can be made uniform, the surface of the safety panel 3 can be heated uniformly and efficiently.

While the present invention is applied to the peeling operation of the safety panel 3 bonded to the thermosetting resin layer 4 as described above, the present invention is not limited thereto and the safety panel 3 bonded by an ultraviolet curing resin can be peeled by the above-mentioned heating system.

According to the present invention, in the cathode ray tube in which the safety panel is bonded, the safety panel can be peeled efficiently by a simple work without being affected by a bad influence such as when the safety panel and the cathode ray tube envelope are damaged. Accordingly, the safety panel and the cathode ray tube envelope provided after the peeling process can be recycled as excellent assembly parts.

Furthermore, according to the peeling apparatus of the present invention, since the safety panel of the cathode ray tube and the resin layer provided just under the safety panel can be heated uniformly and efficiently, the safety panel can be peeled from the cathode ray tube envelope efficiently.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. A method of peeling a safety panel bonded to a front surface of a cathode ray tube with a resin layer comprising the steps of:
    (a) heating the resin layer through the safety panel to soften the resin layer; and
    (b) applying an external force between the softened resin layer and the safety panel to thereby peel the safety panel from the resin layer.

2. A method of peeling a safety panel bonded to a front surface of a cathode ray tube with a resin layer comprising the steps of:
    (a) rapidly heating the resin layer through the safety panel to soften the resin layer; and
    (b) applying an external force between the softened resin layer and the safety panel to thereby peel the safety panel from the resin layer.

3. A method of peeling a safety panel bonded to a front surface panel of a cathode ray tube with a resin layer comprising the steps of:
    (a) heating the resin layer through the safety panel to soften the resin layer;
    (b) applying an external force between the softened resin layer and the safety panel to thereby peel the safety panel from the resin layer, wherein the softening step includes a step of supplying a cathode ray tube having a safety panel bonded thereto in an area in which a heating means is in heating-up state and the peeling step is carried out after the cathode ray tube is taken from the area.

4. A method of peeling a safety panel bonded to a front surface panel of a cathode ray tube with a resin layer comprising the steps of:
    (a) heating the resin layer through the safety panel to soften the resin layer;
    (b) applying an external force between the softened resin layer and the safety panel to thereby peel the safety panel from the resin layer, wherein the heating and softening step is carried out by using a sheet-shaped heater covering the surface of the safety panel.

5. The method according to claim 4, wherein an area of the sheet-shaped heater is selected to be larger than that of the safety panel.

6. The method according to claim 4, wherein the sheet-shaped heater is a ceramic infrared radiation heater.

7. The method according to claim 6, wherein the ceramic heater includes a plurality of individual heater elements disposed in a sheet-like fashion.

8. The method according to claim 7, wherein each of the individual heater elements has an individual temperature controller.

* * * * *